(12) United States Patent
Estevez

(10) Patent No.: US 7,634,226 B2
(45) Date of Patent: Dec. 15, 2009

(54) PROPAGATION OF DATA THROUGHOUT AN AREA USING DISTRIBUTED TRANSPONDERS AND SCANNERS WITH RELATIVE MOVEMENT

(75) Inventor: Leonardo Estevez, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 480 days.

(21) Appl. No.: 11/616,740

(22) Filed: Dec. 27, 2006

(65) Prior Publication Data

US 2008/0160907 A1 Jul. 3, 2008

(51) Int. Cl.
H04H 1/00 (2006.01)
(52) U.S. Cl. .............. 455/3.05; 455/414.1; 455/99; 455/41.1; 455/41.2; 340/10.1; 340/572.18; 340/572.8
(58) Field of Classification Search ............... 455/3.05, 455/99, 41.1, 41.2, 11.1, 552.1, 73, 95, 154.1, 455/297; 340/10.1, 572.1, 572.4, 572.8, 340/5.8, 10.4
See application file for complete search history.

(56) References Cited

U.S. PATENT DOCUMENTS

| 7,272,502 | B2 * | 9/2007 | Lee et al. ............... 701/214 |
| 2007/0035396 | A1 * | 2/2007 | Chand et al. ............ 340/572.1 |
| 2007/0080783 | A1 * | 4/2007 | Ghosh et al. ............ 340/10.1 |
| 2007/0102506 | A1 * | 5/2007 | Stevens ................ 235/376 |
| 2008/0079540 | A1 * | 4/2008 | Aull et al. ............. 340/10.1 |
| 2008/0252424 | A1 * | 10/2008 | Maltseff et al. .......... 340/10.1 |

* cited by examiner

Primary Examiner—Tan Trinh
(74) Attorney, Agent, or Firm—Ronald O. Neerings; Wade James Brady, III; Frederick J. Telecky, Jr.

(57) ABSTRACT

A method is provided for propagating data among multiple locations in an area. The method includes using a plurality of transponders distributed throughout the area, each able to receive, store, and transmit data. The method further includes using scanners moving relative to the transponders, and able to transfer data to and from these transponders over a wide or limited range. When a scanner encounters a transponder (becomes close enough for data communication), it reads data from the transponder and writes data to the transponder, including data read from prior encounters with other transponders. Data written to a transponder by a scanner may include data associated with that scanner, including but not limited to one or more of identification, speed, direction, and time stamp. The method thus propagates data among transponders and makes this transponder data available to scanners as they encounter these transponders. The method propagates data throughout an area without a requirement for a wired or wireless connection between and among the transponders, at a speed dependent on the number of and speed of scanners moving within the area. The method further includes optionally connecting a subset of transponders with a wired or wireless network to more quickly propagate data over the area, while still not requiring every transponder be connected to this network. The method further includes using RFID tags, both adapted and non-adapted to the specific application, as the transponders, and RFID scanners to write to and read from these RFID tags.

19 Claims, 5 Drawing Sheets

PROPAGATION OF DATA THROUGHOUT AN AREA USING DISTRIBUTED TRANSPONDERS AND SCANNERS WITH RELATIVE MOVEMENT

BACKGROUND OF THE INVENTION

1. Field of the Invention

This invention relates generally to data storage and communication, and, more particularly, to a method and system for writing, storing, reading, and propagating data throughout a distributed wireless network utilizing wireless transponders and scanners which are moving relative to each other.

2. Description of the Related Art

Traditional data access and storage systems utilize data access points (for input and/or output of data) at a number of locations, often using a terminal with keyboard and display. Data thus entered or requested, along with data from other sources connected to the network, is typically then transported on a wired or wireless network to and from one or more data storage locations. The wired or wireless network, connecting the multiple access points with the data storage mechanism, enables data access at multiple locations across the network. The cost of each data access point is typically relatively high, given the complexity of electronics at each location. Additionally, the wired or wireless network and data storage hubs used in the typical system further complicate the system. In many such systems, manual input of data is typical, often using a keyboard or barcode reader. If knowledge of user location is desired, such location is typically manually input or is inferred from location of terminals used for data access.

A distributed database minimizing or eliminating the need for a wired or wireless network, could significantly reduce the cost and complexity of such data systems. Position information for users of or items within the area served by the network could also be beneficial.

SUMMARY OF THE INVENTION

In one embodiment of the present invention, a method is provided for writing, storing, and reading data to and from transponders at multiple locations in an area, and for propagating data from location to location, without requiring a wired or wireless data network connecting these multiple locations. The method includes storing data on one or more transponders at locations in the area, each transponder having data receiving, data storage, and data transmission capability. The method also includes reading data from a first of one or more transponders by one or more scanning devices (scanners), storing this data on the scanner, moving the one or more scanners into communication range of a second or subsequent of one or more transponders, and writing all or a portion of the data stored on the scanner to the second or subsequent transponder. In this manner, data from transponders is migrated from each transponder to others, by movement of scanners, relative to the transponders, through the area. If the data transfer between a scanner and transponder can occur only over a limited range, and if a scanner writes identifying data to transponders as they are encountered, a record of scanner encounters is left on those transponders. If transponders are in known, fixed positions within the area, a data record of scanner position is generated and stored on those transponders, which data may then be transferred to other scanners as they encounter those transponders.

In another embodiment of the present invention, the method described above further comprises multiple radio frequency identification (RFID) tags adapted to function as transponders distributed throughout an area, and one or more RFID scanners moving through the area relative to those transponders and able to write data to and read data from these RFID tags. As described above, data from RFID tags is thus migrated from one to others, by relative physical movement of RFID scanners through the area, rather than by a wired or wireless network infrastructure. If the communication range of the RFID tags and RFID scanners is limited, data on approximate position of RFID scanners may be stored on RFID tags as the scanners encounter tags. This position data, which may also include a time stamp for each encounter, is then propagated through the area as described above.

In another embodiment of the present invention, the method further includes connecting a subset of transponders or RFID tags by a wired or wireless network, thus facilitating communication of data between or among two or more locations in the area, more rapidly than would occur by relative physical movement of scanners through the area.

In yet another embodiment of the present invention, a system comprises multiple transponders in an area, and one or more scanners moving through the area relative to those transponders, the scanners able to write data to and read data from the transponders. The transponders are adapted to receive and store data from scanners, and transmit data to scanners. The scanners are adapted to receive and store data from transponders, and write to transponders all or a portion of data received from prior encounters with other transponders. Data from transponders is thus migrated from one to others by relative physical movement of scanners through the area, rather than by a wired or wireless network infrastructure.

Technical advantages of one or more embodiments of the present invention may include significant cost reduction of the overall data storage and access system, especially if the stationary transponders are low-cost passive RFID tags. Further significant cost and complexity reduction may be achieved by reducing or eliminating the need for a network infrastructure connecting multiple locations in the area. Writing and reading data to and from the RFID tags may also occur without user intervention, when a scanner encounters a tag. Positional awareness is a further technical advantage, if the communication range between scanner and transponder is limited, as is generally the case with RFID tags and RFID scanners.

As further described below, the disclosed embodiments provide a combination of desirable properties not available in the known art. These properties include the technical and cost advantages described above. Further benefits and advantages will become apparent to those skilled in the art to which the invention relates.

BRIEF DESCRIPTION OF THE DRAWINGS

Example embodiments of the invention are described below with reference to the accompanying drawings, wherein.

Throughout the drawings, like elements are referred to by like numerals.

DETAILED DESCRIPTION

Embodiments of the present invention and its advantages are best understood by referring to FIGS. 1 through 6 of the drawings, like numerals being used for like and corresponding parts of the various drawings.

Figure 1:
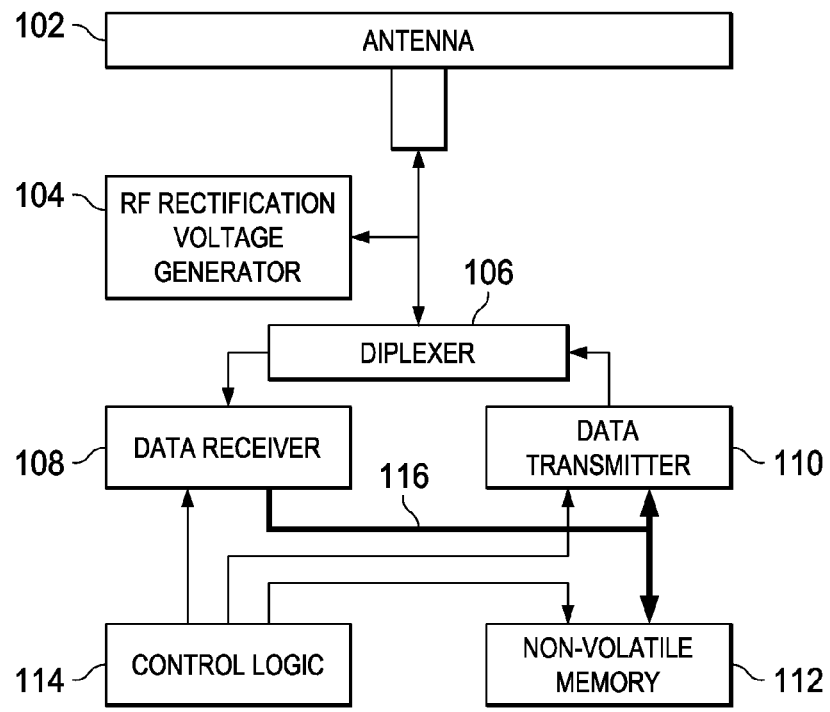
FIG. 1 is a block diagram of a typical known passive RFID tag.

FIG. 1 is a block diagram of a typical transponder, which in some embodiments is a passive RFID tag. Antenna 102, when excited by the radio-frequency (RF) field of a nearby transmitter (scanner), generates an alternating current or voltage which is rectified by RF rectification voltage generator 104. This rectified RF signal produces the voltage and current required for operation of the RFID tag, thus eliminating the need for a battery in the RFID tag. Alternate tag embodiments, called active RFID tags, use a battery rather than rectified RF for power, typically to allow greater transmit power and range. RF energy from antenna 102 also is coupled to diplexer 106. This diplexer acts to couple received energy from the antenna 102 to data receiver 108 (during reception), and transmitted energy from data transmitter 110 to antenna 102 (during transmission).

Data receiver 108 receives and demodulates the RF signal, providing as an output digital data on data bus 116. Data received is stored in non-volatile memory 112. Control logic 114 controls timing of reception and transmission of data, and data selection and flow from receiver to memory and memory to transmitter. Data transmitter 110 modulates and transmits data from memory 112, as controlled by control logic 114. The output of data transmitter 110 is coupled through diplexer 106 to antenna 102. The transponder thus can receive data from a nearby scanner, and transmit data back to the scanner.

Figure 2:
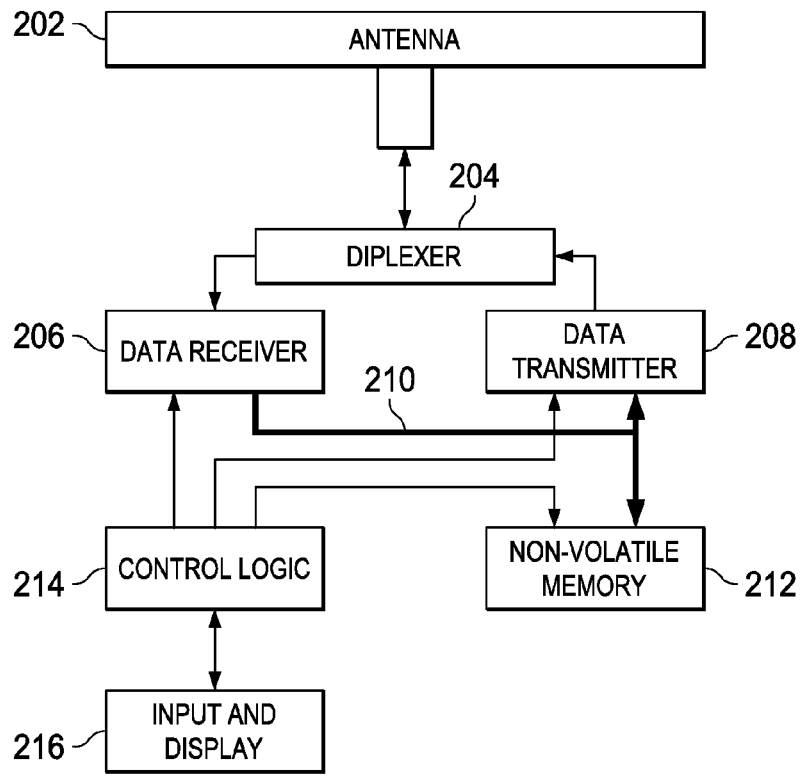
FIG. 2 is a block diagram of a typical known RFID scanner.

FIG. 2 is a block diagram of a typical scanner, which in some embodiments is an RFID scanner. Data stored in non-volatile memory 212 is modulated and transmitted by data transmitter 208, which is coupled to antenna 202 through diplexer 204. Received signals from antenna 102 are coupled through diplexer 204 to data receiver 206.

Data receiver 206 receives and demodulates the incoming RF signal, providing as an output digital data on data bus 210. Data received is stored in non-volatile memory 212. Control logic 214 controls timing of reception and transmission of data, and data selection and flow from receiver to memory and memory to transmitter. Data transmitter 208 modulates and transmits data from memory 212, as controlled by control logic 214. The output of data transmitter 208 is coupled through diplexer 204 to antenna 202.

Input and display 216 comprises typical data entry and display mechanisms such as a keypad, keyboard, bar-code scanner, liquid-crystal display (LCD) viewing screen, or other known input and display mechanisms. It enables input of data which is then stored in non-volatile memory 212, as well as display of data received from transponders. Control logic 214 regulates the flow of data among the receiver 206, memory 212, transmitter 208, and input/display 216.

Figure 3:
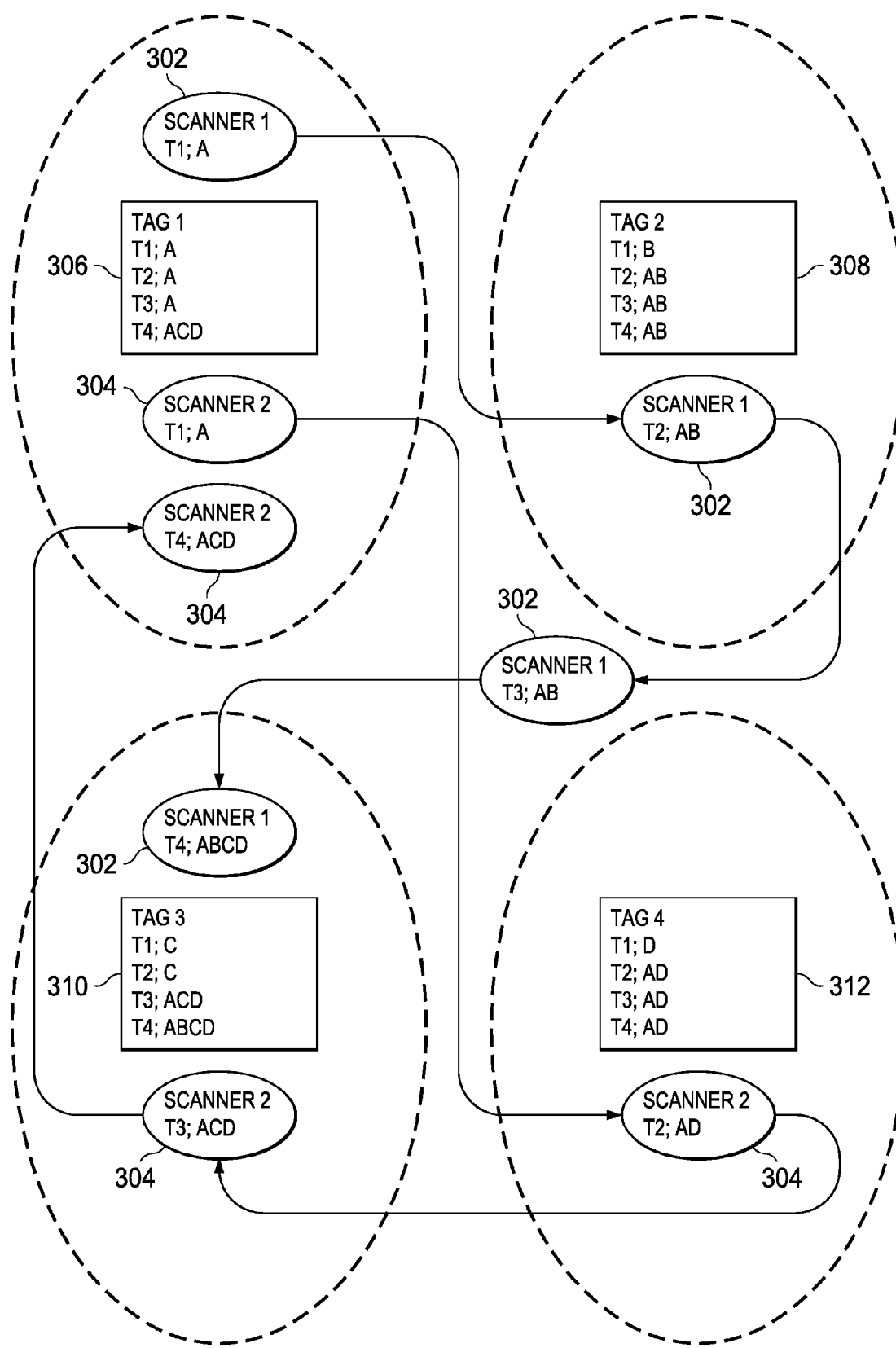
FIG. 3 is a flow diagram showing propagation of data among a plurality of fixed transponders by moving scanners.

FIG. 3 shows schematically an example of the flow of data over time as two scanners move through an area having 4 transponders (tags). In this example, movement of scanners from one tag to another occurs at the same time (synchronously) for simplicity and clarity. It will be apparent that asynchronous movement of transponders (the more likely scenario) has a similar effect of spreading data through the area.

At time T1, scanner 1 302 and scanner 2 304 both encounter tag 1 306—that is they are near enough to activate the tag, transmit data to the tag, and receive data from the tag. At time T1, tag 1 306 has data A in tag memory. This data A is transmitted to both scanner 1 302 and scanner 2 304, which both store the data in scanner memory. In this example, prior to receiving data A from tag 1 306, scanners 1 302 and 2 304 have no data in memory. After the encounter with tag 1 306, scanners 1 302 and 2 304 thus have data A in scanner memory.

At time T2, scanner 1 302 encounters tag 2 308. Scanner 1 302 transmits data A (from its earlier encounter with tag 1 306) to tag 2 308, which stores the data in tag memory. Tag 2 308 has previously-stored data B in tag memory, which is transmitted to scanner 1 302 and stored in scanner memory. At the completion of the encounter, scanner 1 302 has data AB in scanner memory, and tag 2 308 has data AB in tag memory. Also at time T2, scanner 2 304 encounters tag 4 312. Scanner 2 304 transmits data A (from its earlier encounter with tag 1 306) to tag 4 312, which stores the data in tag memory. Tag 4 312 has previously-stored data D in tag memory, which is transmitted to scanner 2 304 and stored in scanner memory. At the completion of the encounter, scanner 2 304 has data AD in scanner memory, and tag 4 312 has data AD in tag memory.

At time T3, scanner 1 302 is too far from any tag for data communication, and retains data AB in tag memory. Also at time T3, scanner 2 304 encounters tag 3 310. Scanner 2 304 transmits data AD (from its earlier encounters with tags 1 306 and 4 312) to tag 3 310, which stores the data in tag memory. Tag 3 310 has previously-stored data C in tag memory, which is transmitted to scanner 2 304 and stored in scanner memory. At the completion of the encounter, scanner 2 304 has data ACD in scanner memory, and tag 3 310 has data ACD in tag memory.

At time T4, scanner 1 302 encounters tag 3 310. Scanner 1 302 transmits data AB (from its earlier encounters with tag 1 306 and tag 2 308) to tag 3 310, which stores the data in tag memory. Tag 3 310 has previously-stored data ACD in tag memory, which is transmitted to scanner 1 302 and stored in scanner memory. At the completion of the encounter, scanner 1 302 has data ABCD in scanner memory, and tag 3 310 has data ABCD in tag memory. Also at time T4, scanner 2 304 again encounters tag 1 306. Scanner 2 304 transmits data ACD (from its earlier encounters with tag 1 306, tag 3 310, and tag 4 312) to tag 1 306, which stores the data in tag memory. Tag 1 306 has previously-stored data A in tag memory, which is transmitted to scanner 2 304 and stored in scanner memory. At the completion of the encounter, scanner 2 304 has data ACD in scanner memory, and tag 1 306 has data ACD in tag memory.

After four time periods, tag 3 310 thus has the full set of data from all 4 tags. Data A and D was received from scanner 2 304 at time T3; data B was received from scanner 1 302 at time T4; data C was originally stored on tag 3 310. By extension, it can be seen that further random movement of one or more scanners among multiple tags will eventually result in most or all tags having most or all of the data from the other tags.

Figure 4:
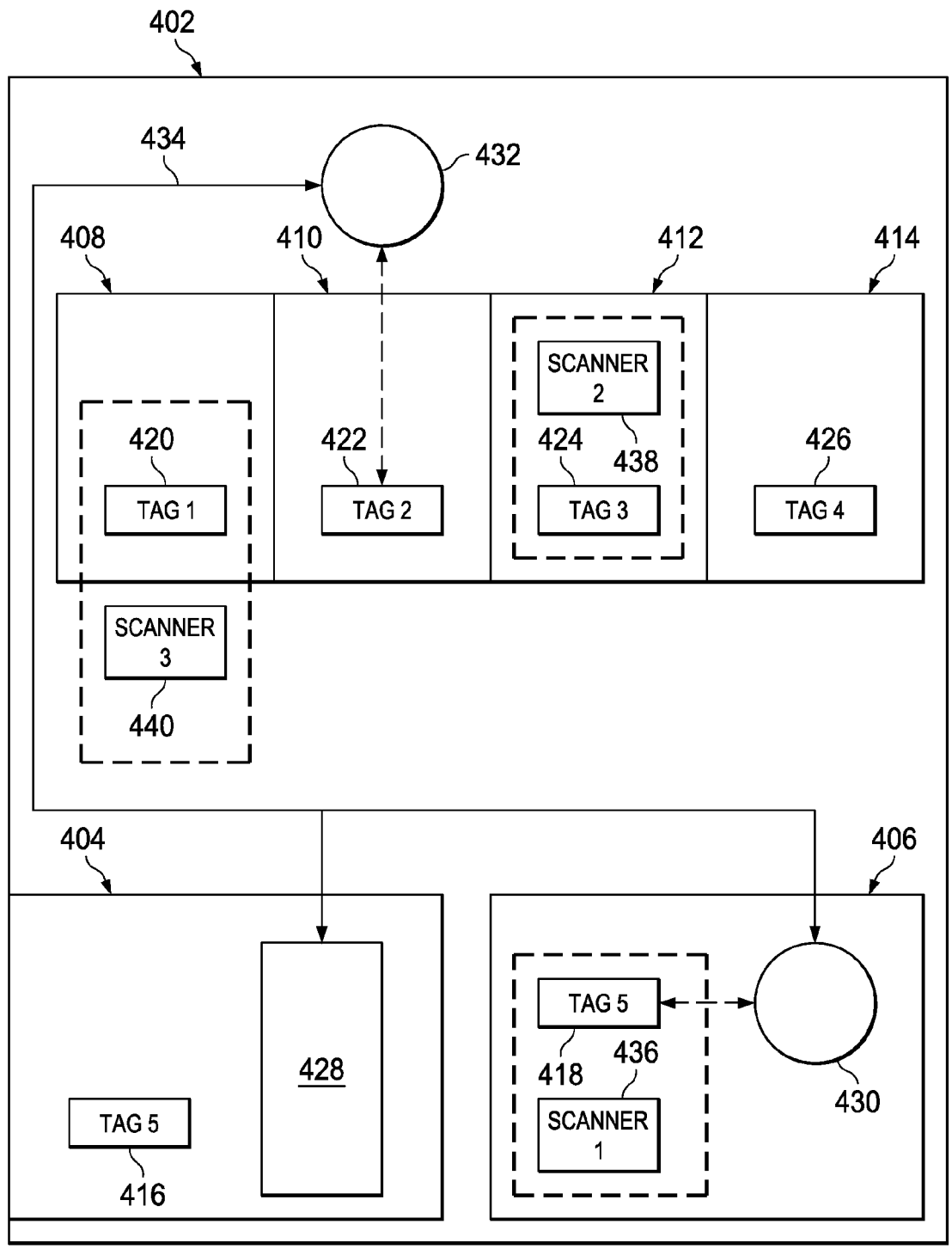
FIG. 4 is a block diagram of a system for tracking location of personnel or equipment within an area.

FIG. 4 shows an example application of such a method and system in a facility 402 where it is desired to know the whereabouts of persons and/or equipment. Tags are placed at locations throughout the facility where movement of persons and/or equipment is anticipated—for example, doorways to each area 408, 410, 412, 414, area 404, area 406, and so forth. Each person and/or piece of equipment carries a scanner 436, 438, 440 able to encounter tags as described above. As scanners move through the facility and encounter tags, each transmits a time-stamped, unique identification to that tag. A database of scanner location and time at each location is thus generated on the plurality of transponders, and is available to other scanners as they encounter transponders. A querying scanner may determine the position of another scanner on other personnel or equipment with reasonable precision, by interrogating this database to determine which transponder corresponds to the most recent time stamp for the scanner identification whose position is being sought. Although not required for system operation, a subset of tags, for example tag 6 418 and tag 2 422 as shown, can be connected to data local area network (LAN) 434 via interfaces 430, 432. Such a connection may be used to more rapidly transfer and synchronize data on tags so connected, and may further provide tag data to a centralized data query point such as terminal 428 in area 404. Multiple tags may be used at each point of connection to a data network if required for additional storage capacity.

The example application of FIG. 4 shows 3 scanners. One user with scanner 1 436 is in area 406, near enough tag 6 418 for data transfer; a piece of equipment has scanner 2 438 and is in area 412, near enough tag 3 424 for data transfer; and a user with scanner 3 440 is outside area 408, but near enough tag 1 420 for data transfer. As scanners move through the various areas, position versus time data for each scanner propagates to all or most of the tags and other scanners, and to terminal 428 via the LAN 434.

Figure 5:
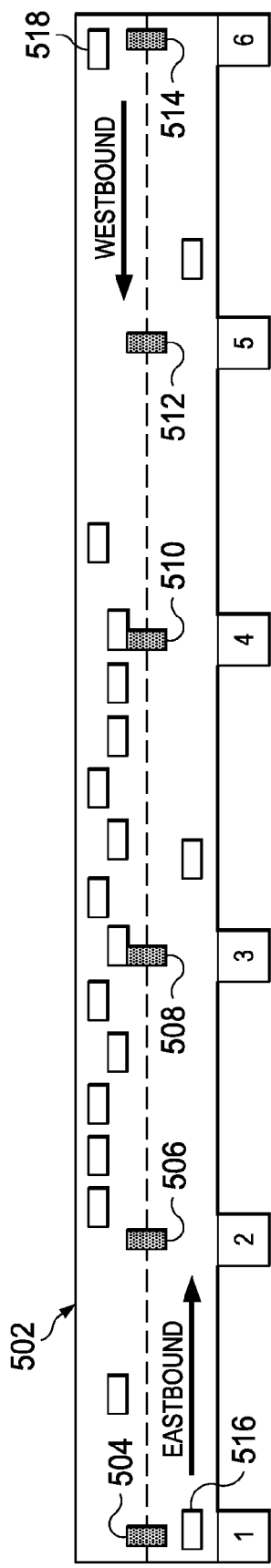
FIG. 5 is a diagram of a system for propagating traffic speed data along a highway, without requiring physical or wireless connection among transponders along the highway.

FIG. 5 shows an application of distributed transponders and mobile scanners used for propagating traffic information to vehicles traveling along a roadway. FIG. 5 shows, schematically and not to scale, a portion of highway 502, with six uniquely serialized RFID tags 1 through 6 (504, 506, 508, 510, 512, 514) placed typically in the center of the highway at 1-mile intervals ("mile markers"). Eastbound traffic is flowing at a steady 60 MPH; westbound traffic is also flowing 60 MPH except for a slowdown to 30 MPH between mile marker 4 and mile marker 2. Some or all vehicles in each direction are equipped with scanners operable to read and write data from and to tags along the roadway.

As a scanner-equipped vehicle passes a tag, the scanner writes the vehicle's current speed and direction data to the tag. Each tag has a storage register for both westbound and eastbound speed, that register typically storing data on tag number, speed, and direction (E or W in this example). Eastbound vehicles read from the tag the westbound tag number and speed values from the westbound registers, and westbound vehicles read from the tag the eastbound tag number and speed values from the eastbound registers. As an eastbound vehicle moves past multiple tags, it thus writes its current eastbound speed data to each tag, and reads westbound speed data at that tag for the most recent westbound vehicle. The result is a dataset on the eastbound scanner of n westbound speed values for the last n miles. These n values are stored in a first-in-first-out manner, resulting in the eastbound scanner having westbound speed data for the most recently passed n tags. This n-value westbound speed dataset is written to each tag as it is passed, overwriting prior datasets. Westbound scanners in a like manner store a dataset of eastbound speeds and write that eastbound speed dataset to tags as they are passed.

After a suitable time period, each tag therefore has an eastbound and westbound speed dataset, each having n speed values and thus covering +/−n miles from the tag location. The dataset of eastbound speeds is propagated westward by westbound scanners and vice versa. The scanners are able to read this dataset as tags are passed, giving the driver recent information on traffic conditions ahead up to n miles.

In the example of FIG. 5, a method for propagating traffic speed data over a 5-mile portion of highway is described. An eastbound vehicle equipped with a scanner 516 as described above, capable of reading from and writing to the memory of the RFID tags 504-514 along the roadway. Tags are labeled according to the mile marker; tag 1 504 is at mile marker 1, for example.

When scanner 516 passes tag 1 504, the scanner 516 writes current speed data for its vehicle to tag 1 504 register V(e,1) (current eastbound speed, at tag 1). It also reads speed data from tag 1 504 register V(w,1) (current westbound speed, at tag 1), which was written by the last westbound vehicle passing tag 1 504. This westbound speed data V(w,1) is stored in the first of 5 registers on scanner 516. As scanner 516 continues to pass tags 506, 508, 510, 512, and 514 during the next 5 minutes, it writes its current speed data to each as described for tag 1, and reads V(w,n) from each tag, storing each V(w,n) in registers 2 through 5 on scanner 516. On passing tag 6 514, scanner 516 has completed a dataset for westbound speeds at tags 1 through 5, and writes this dataset to tag 6 514. A westbound vehicle 518 passing tag 6 514 thus is able to read from tag 6 514 a dataset of westbound speeds for the 5 miles ahead, current within 5 minutes. The slowdown two miles ahead will be apparent, allowing appropriate deviation if desired.

The system and method described uses moving scanners and fixed tags to generate a database of traffic conditions on each tag covering m miles in either direction. At normal traffic speeds and densities, especially in areas where monitoring traffic flow is desirable, the data for many miles of roadway is only minutes old and is constantly updated as scanner-equipped vehicles travel the roadway.

Figure 6:
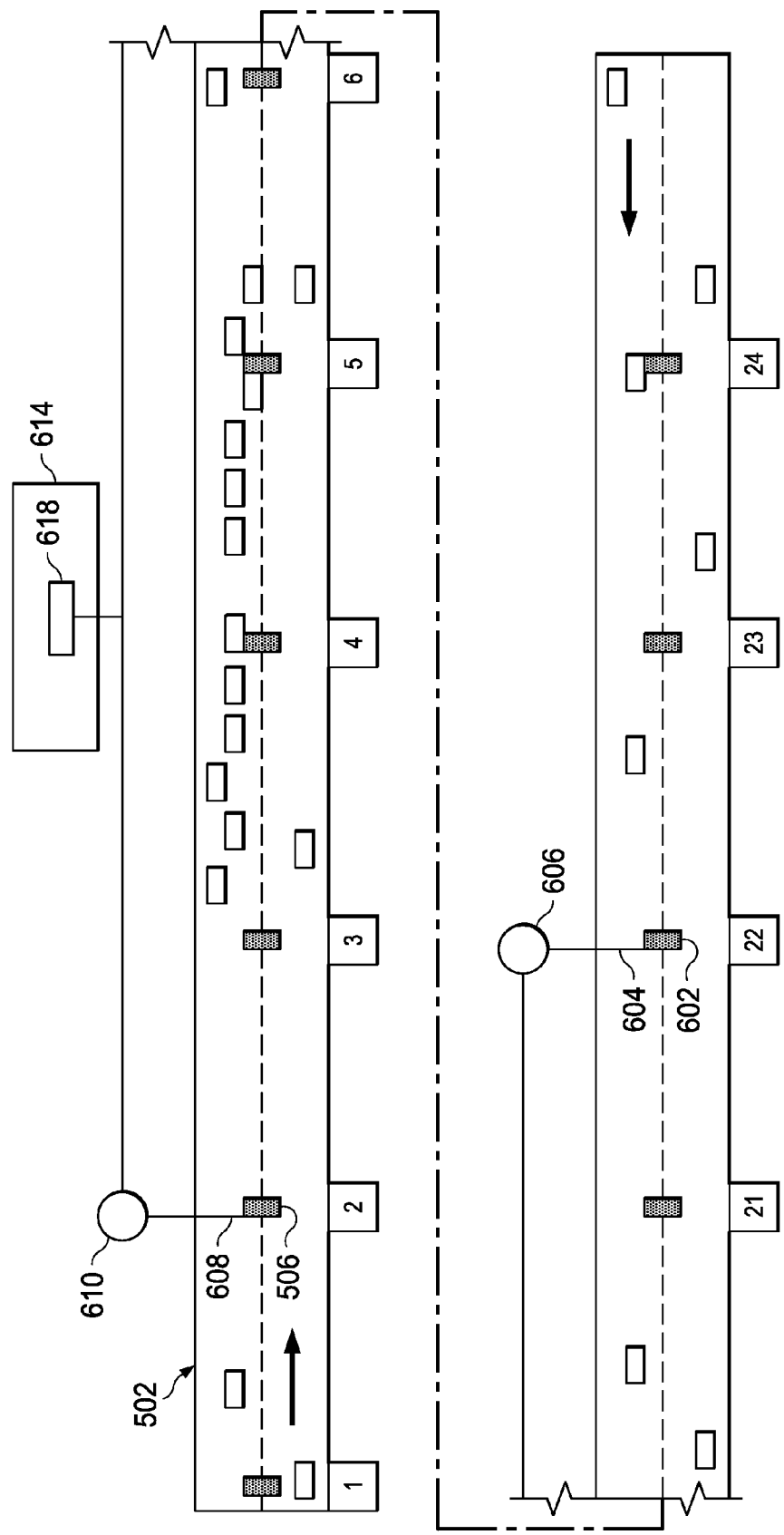
FIG. 6 is a diagram showing the addition of a wired or wireless network linking a subset of transponders of FIG. 5.

FIG. 6 shows schematically and not to scale how a wired or wireless data network may be used to link one or more tags of the system described in FIG. 5 to each other and to a central data monitoring location. As described above, tag 506 at mile marker 2 gathers speed data from westbound and eastbound vehicles; scanners in the vehicles then propagate that data to more distant tags. Data link 608 is a wired or wireless data connection using known methods and apparatus to move data between tag 506 and network node 610. Data link 604 is a wired or wireless data connection using known methods and apparatus to move data between tag 602 at mile marker 22 and network node 606. Node 610, node 606, and data gathering computer 618 at central location 614 are all linked by network connection 612, which is a wired or wireless network using known technology. Eastbound speed data present on tag 602 is quickly sent to tag 506, providing an additional 20 miles of traffic data. Thus, speed data for 40 miles ahead is made available at tag 506 and at central data monitoring location 614, with data latency less than if data was propagated only by moving scanners. Data passed from tag 506 to tag 602 similarly provides increased traffic data for westbound vehicles.

At normal traffic flows, tags 506 and 602 (spaced for example 20 miles apart) have speed data for 40 miles as described above, with data latency of typically 20 minutes at normal traffic speeds, and using only two network nodes spaced 20 miles apart. The density of network nodes is much less than would be required by a traditional system having a network node at every data gathering location (every mile in this example). Many traditional systems also would typically utilize a more expensive flow monitoring system at each mile of the roadway, each requiring a communication link back to the central data collection point.

Those skilled in the art to which the invention relates will appreciate that yet other substitutions and modifications can be made to the described embodiments, without departing from the spirit and scope of the invention as described by the claims below.

What is claimed is:

1. A method for propagating data across an area, comprising:
   providing a plurality of transponders at locations in an area, each transponder operable to receive, store, and transmit data;
   providing at least one scanner operable to receive, store, and transmit data;
   transferring data associated with a first one of said transponders from said first transponder to said at least one scanner;
   moving said at least one scanner relative to said plurality of transponders;
   transferring said data associated with said first transponder from said at least one scanner to a second one of said transponders;
   transferring data associated with said second transponder from said second transponder to said at least one scanner;
   moving said at least one scanner relative to said plurality of transponders; and transferring said data associated with said first transponder and said data associated with said second transponder from said at least one scanner to a third one of said transponders;
   whereby data associated with transponders is propagated among said plurality of transponders, and may further be transferred from one or more of said plurality of transponders to said at least one scanner.

2. The method of claim 1, wherein said step of transferring data associated with said first transponder to said at least one scanner further comprises;
   transferring data associated with and identifying said at least one scanner to said first transponder;
   adding said data associated with and identifying said at least one scanner to said data associated with said first transponder;
   whereby said data associated with and identifying said at least one scanner is propagated from said first transponder to said second one of said transponders and said third one of said transponders as described in claim 1.

3. The method of claim 2, further comprising:
   transferring said data associated with and identifying said at least one scanner from said at least one scanner to at least one transponder, only when said at least one scanner is within a limited distance of said at least one transponder;
   whereby presence of said data associated with and identifying said at least one scanner on said at least one transponder indicates that said at least one scanner was within said limited distance of said at least one transponder.

4. The method of claim 3, further comprising:
   including time stamp data in the data associated with and identifying said at least one scanner;
   whereby presence of said data associated with and identifying said at least one scanner on said at least one transponder indicates that said at least one scanner was within said limited distance of said at least one transponder at the time denoted by said time stamp data.

5. The method of claim 4 further comprising:
   including scanner speed data in the data associated with and identifying said at least one scanner;
   whereby presence of said data associated with and identifying said at least one scanner on said at least one transponder indicates that said at least one scanner was within said limited distance of said at least one transponder at the time denoted by said time stamp data and was moving at said speed at said time.

6. The method of claim 1, further comprising:
   transferring data between two or more of said plurality of transponders using an electronic data communication link,
   whereby data associated with a first one of said transponders so linked to another one or more transponders may be rapidly transferred to said one or more transponders.

7. The method of claim 1, wherein one or more of said plurality of transponders is a radio frequency identification (RFID) tag.

8. The method of claim 1, wherein said at least one scanner is an RFID scanner.

9. A method for propagating time, speed and position data associated with vehicles on a roadway which may be a road, track or similar guiding mechanism, so as to make data on traffic conditions available to drivers of other vehicles or other persons desiring such data, comprising;
   providing a plurality of RFID tags at known locations along a roadway, each RFID tag operable to receive, store, and transmit data;
   providing a plurality of RFID scanners, one per vehicle so equipped, operable to receive, store, and transmit data, and with at least one RFID scanner equipped vehicle traveling in a first direction along the roadway and at least one RFID scanner equipped vehicle traveling in a second direction substantially opposite the first direction;
   providing time, speed, and direction data to the RFID scanner in each respective vehicle;
   transferring time, speed, and direction data associated with a first vehicle, traveling in said first direction, from the RFID scanner in said first vehicle to a first RFID tag, and transferring previously-stored data from said first RFID tag to said RFID scanner in said first vehicle, when said RFID scanner in said first vehicle passes within communication range of said first RFID tag;
   transferring time, speed, and direction data associated with a second vehicle, traveling in said second direction, from the RFID scanner in said second vehicle to said first RFID tag, and transferring previously-stored data, including time, speed and direction data from said first vehicle traveling in said first direction, from said first RFID tag to said RFID scanner in said second vehicle, when said RFID scanner in said second vehicle passes within communication range of said first RFID tag;
   moving said RFID scanner in said first vehicle relative to said plurality of RFID tags so as to become within communication range of a second RFID tag at some distance further along the roadway in the first direction;
   transferring time, speed, and direction data associated with said first vehicle, and data associated with said first RFID tag as transferred during communication between said first vehicle and said first RFID tag, from the RFID scanner in said first vehicle to said second RFID tag, and transferring previously-stored data from said second RFID tag to said RFID scanner in said first vehicle;
   moving said RFID scanner in said second vehicle relative to said plurality of RFID tags so as to become within communication range of a third RFID tag at some distance further along the roadway in the second direction;
   transferring current time, speed, and direction data associated with said second vehicle, and transferring previously-stored data associated with said first RFID tag, including time, speed, and direction data associated with said first vehicle, from the RFID scanner in said second vehicle to said third RFID tag, and transferring previously-stored data from said third RFID tag to said RFID scanner in said second vehicle;

moving said RFID scanner in said first vehicle in the first direction relative to said plurality of RFID tags so as to become within communication range of each subsequent RFID tag along the roadway, at each tag transferring current time, speed, and direction data associated with said first vehicle from the RFID scanner in said first vehicle to said each subsequent RFID tag, and transferring previously-stored data from prior RFID tag encounters to said each subsequent RFID tag;

moving said RFID scanner in said second vehicle in the second direction relative to said plurality of RFID tags so as to become within communication range of each subsequent RFID tag along the roadway, at each tag transferring current time, speed, and direction data associated with said second vehicle from the RFID scanner in said second vehicle to said each subsequent RFID tag, and transferring previously-stored data from prior RFID tag encounters to said each subsequent RFID tag;

whereby time, speed and direction data, at said first tag for said first vehicle traveling in said first direction, is propagated by said second vehicle, traveling in said second substantially opposite direction, to RFID tags along the roadway in the direction opposite the direction of said first vehicle, thus making available to a third vehicle traveling in the first direction data on traffic speed at said first RFID tag, and by extension, other RFID tags some distance ahead of said third vehicle;

whereby and also by extension, making available to a fourth vehicle traveling in the second direction data on traffic speed at said first RFID tag, and by extension, other RFID tags some distance ahead of said fourth vehicle.

10. The method of claim 9, further comprising:
a data communication link connecting two or more of the RFID tags deployed along the roadway;
whereby the database of traffic speed at a plurality of RFID tags is more rapidly transferred some distance along the roadway than if transferred by movement of RFID scanners in vehicles.

11. The method of claim 10, further comprising:
A data communication link connecting a data collection and display device such as a computer to one or more of said plurality of RFID tags.

12. The method of claim 9, further comprising:
Sequentially numbering transponders along the roadway in a monotonic manner;
Computing direction data in the scanner by noting whether the most recently passed transponder numbers are increasing or decreasing;
Generating direction data I or D respectively;
Transferring this data I or D to transponders as they are encountered.

13. A system for propagating data across an area, comprising:
a plurality of transponders at locations in an area, operable to receive, store, and transmit data;
one or more scanners moving in the area relative to said plurality of transponders, and operable to move into communication range of a first of the plurality of transponders and transfer data between said scanner and said first transponder;
said one or more scanners operable to move into communication range of another of said plurality of transponders, and transfer data between said scanner and said another transponder, including data previously transferred to said scanner, and data from said another transponder;
whereby data is propagated among transponders across the area.

14. The system of claim 13, wherein scanners and/or transponders are adapted to intentionally limit the communication range between or among said scanners and transponders, whereby presence of data from a scanner on a transponder is indicative of that transponder and that scanner being within said limited range of each other at some time.

15. The system of claim 14, wherein the data associated with the scanner includes a scanner identification and a time stamp, whereby data on approximate time-dependent position for said scanner is propagated across an area and made available to other scanners as they read data from one or more transponders.

16. The system of claim 14, wherein the data associated with the scanner includes scanner speed and a time stamp, whereby speed data and time-dependent position data for said scanner is propagated across an area and made available to other scanners as they read data from one or more transponders.

17. The system of claim 14, further comprising an electronic data communication link operable to transfer data between a transponder and another transponder, whereby the data present on a transponder so linked to said another transponder may be rapidly transferred to said another transponder so as to be made available to scanners reading data from said another transponder.

18. The system of claim 14, wherein the one or more of the plurality of transponders is a radio frequency identification (RFID) tag.

19. The system of claim 14, wherein the scanner is an RFID scanner.

* * * * *